(12) United States Patent
Wolterink et al.

(10) Patent No.: US 8,482,857 B2
(45) Date of Patent: Jul. 9, 2013

(54) METHOD OF MANUFACTURING A LENS ASSEMBLY, AS WELL AS A CAMERA PROVIDED WITH SUCH AN ASSEMBLY

(75) Inventors: Edwin Maria Wolterink, Valkenswaard (NL); Koen Gerard Demeyer, Genk (BE); Alexandra Emanuela Weinbeck, GM's-Hertogenbosch (NL)

(73) Assignee: Anteryon International B.V., Eindhoven (NL)

( * ) Notice: Subject to any disclaimer, the term of this patent is extended or adjusted under 35 U.S.C. 154(b) by 504 days.

(21) Appl. No.: 12/681,986

(22) PCT Filed: Oct. 3, 2008

(86) PCT No.: PCT/NL2008/000216
§ 371 (c)(1),
(2), (4) Date: Jun. 8, 2010

(87) PCT Pub. No.: WO2009/048320
PCT Pub. Date: Apr. 16, 2009

(65) Prior Publication Data
US 2010/0246020 A1    Sep. 30, 2010

(30) Foreign Application Priority Data

Oct. 10, 2007    (NL) ..................................... 1034496

(51) Int. Cl.
*G02B 27/10* (2006.01)
*B29D 11/00* (2006.01)
(52) U.S. Cl.
USPC .......................... 359/622; 264/1.36; 264/1.38
(58) Field of Classification Search
USPC   359/622, 642; 351/159.73, 159.74; 264/1.32, 264/1.36, 1.38, 2.2–2.4
See application file for complete search history.

(56) References Cited

U.S. PATENT DOCUMENTS

| 3,532,038 | A | 10/1970 | Rottmann |
| 2004/0100700 | A1 | 5/2004 | Kitamura et al. |

FOREIGN PATENT DOCUMENTS

| EP | 1 180 428 A | 2/2002 |
| EP | 1180428 A1 * | 2/2002 |
| EP | 1 701 202 A | 9/2006 |
| WO | 2004/027880 A | 4/2004 |

OTHER PUBLICATIONS

International Search Report for corresponding PCT Application No. PCT/NL2008/000216 mailed May 5, 2009.
Written Opinion of the International Searching Authority in corresponding PCT Application No. PCT/NL2008/000216 mailed Apr. 22, 2010.

* cited by examiner

*Primary Examiner* — James Greece
(74) *Attorney, Agent, or Firm* — Wood, Phillips, Katz, Clark & Mortimer

(57) ABSTRACT

Method of manufacturing a lens assembly by means of a replication process, wherein the following steps are carried out i) introducing a first, liquid, UV curable composition (2) into a first mould (1) provided with regularly spaced-apart cavities (6), ii) curing said first composition by UV radiation so as to obtain a first lens element comprising lenses arranged beside each other, wherein the surface of the obtained lens element is the negative of that of the cavities, iii) applying a second, liquid, UV curable composition (5) to the first composition cured in step ii), iv) placing a second mould (4) on the second composition (5) applied in step iii), which second mould is provided with regularly spaced-apart recesses (7), in such a manner that said recesses will fill with the second composition, v) curing the second composition by UV radiation so as to obtain a second lens element comprising lenses arranged beside each other, wherein the surface of the obtained lens element is the negative of that of the recesses, and vi) possibly removing the first and/or the second mould.

32 Claims, 14 Drawing Sheets

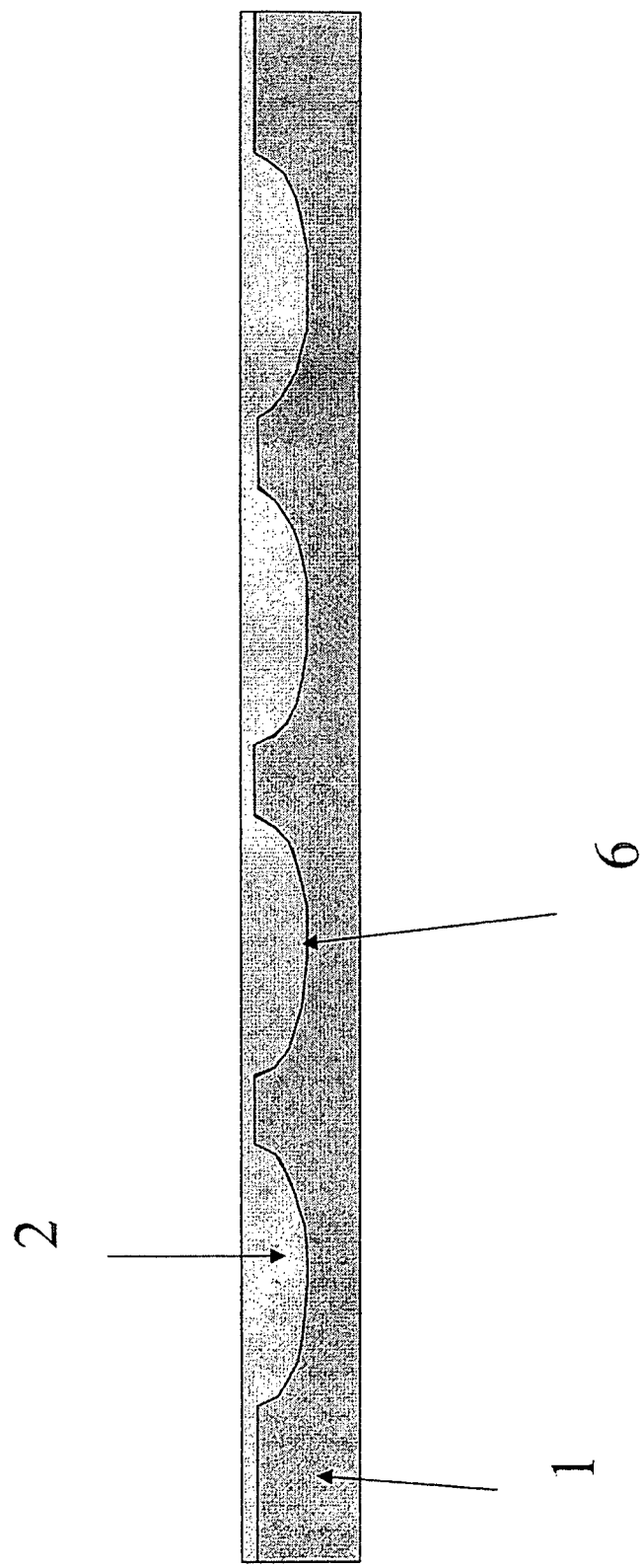

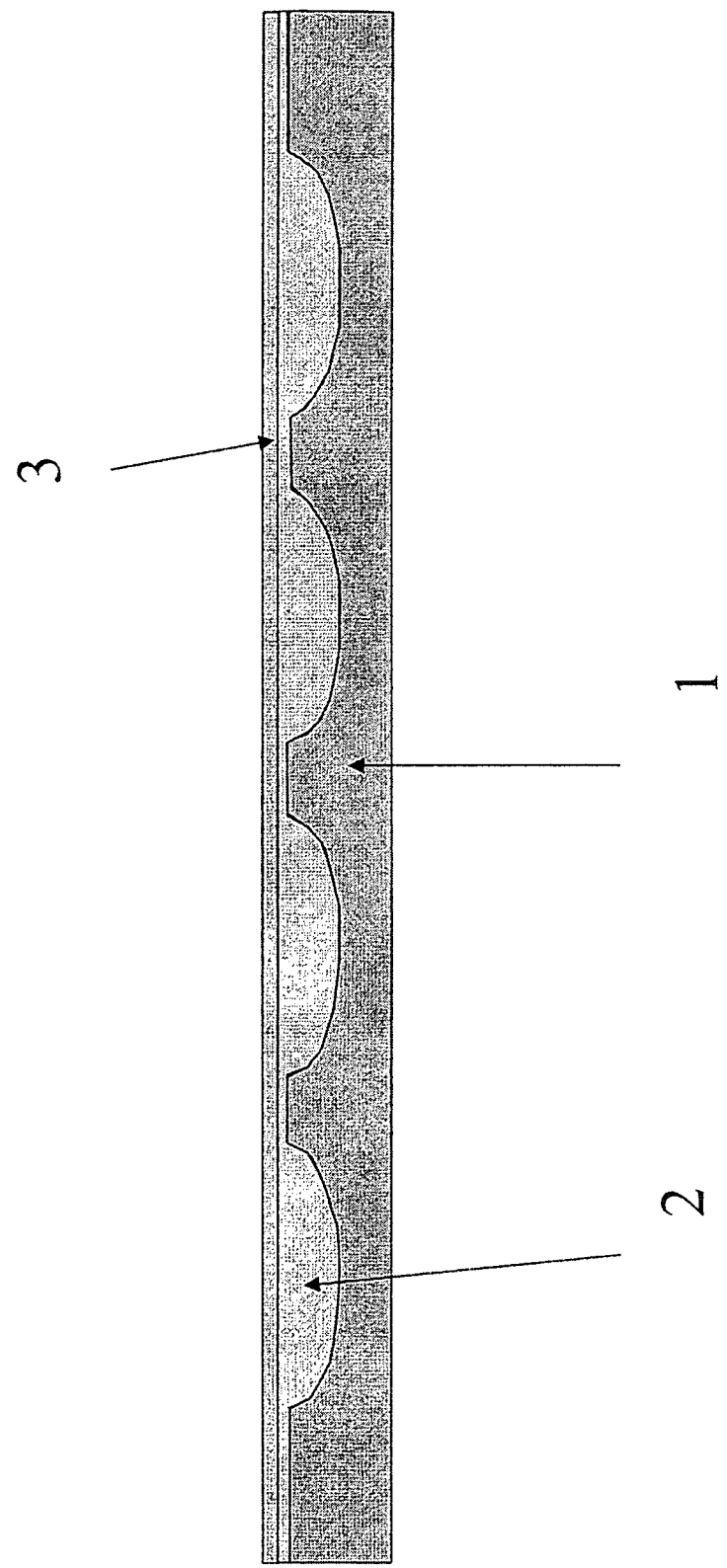

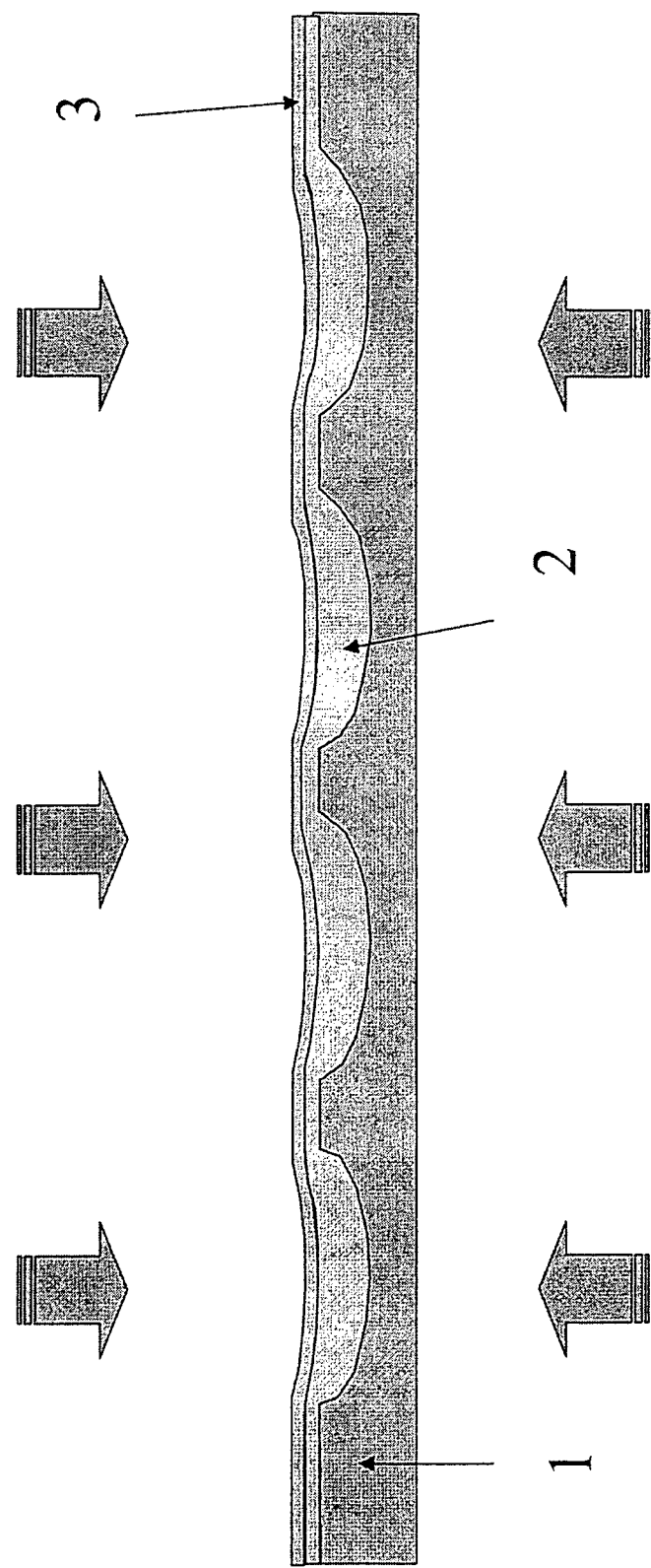

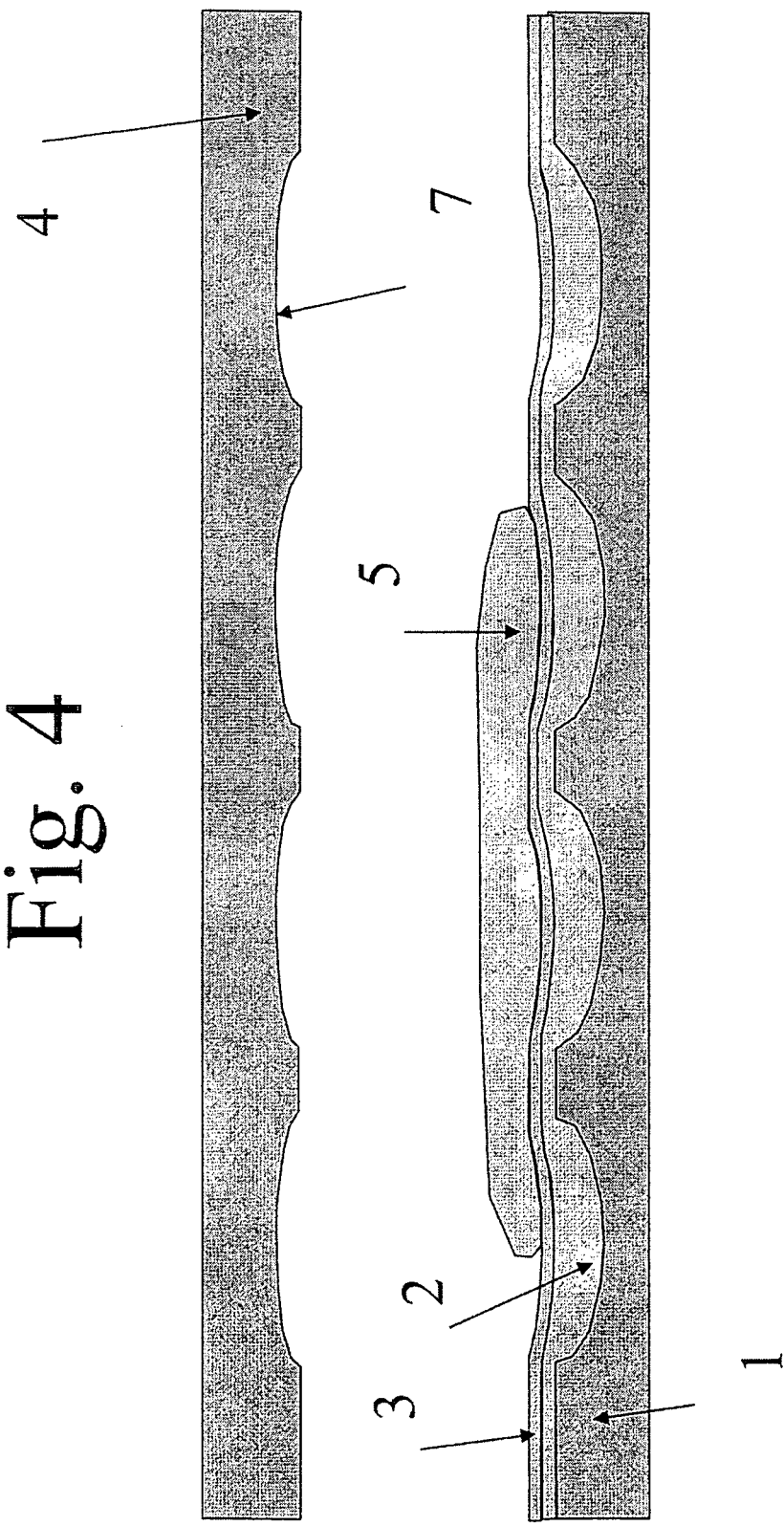

METHOD OF MANUFACTURING A LENS ASSEMBLY, AS WELL AS A CAMERA PROVIDED WITH SUCH AN ASSEMBLY

FIELD OF THE INVENTION

The present invention relates to a method of manufacturing a lens assembly by means of a replication process. The invention further relates to a lens assembly, a lens stack as well as a camera provided with such a lens assembly.

From U.S. Pat. No. 3,532,038 there is known an optical system in which a transparent base member is provided with lenticular lens cavities, which cavities are filled with a refractive fluid, the surface of which fluid is covered with a cover member. The cover member is provided with an aperture plate, on which finally a second base member is present, which is also provided with lenticular lens cavities, which cavities are likewise filled with a refractive fluid.

From US 2004/0100700 there is known a method of manufacturing a microlens array, wherein the cavities in a mould are filled with a UV curable resin, whilst the resin outside the cavities is removed by placing a transparent quartz board on top of the mould. The fluid present in the cavities is then formed into a plurality of separate lenses, whereupon a second UV curable resin layer is applied to the transparent board, which resin layer is cured by making use of the already formed separate lenses. The excess amount of the cured second resin layer is removed by using an organic solvent. Only one layer of replicated lenses is mentioned in said document, which lenses are separately arranged and do not exhibit any interconnection.

The replication process referred to in the introduction is known per se from U.S. Pat. Nos. 4,756,972 and 4,890,905, which disclose the possibility of manufacturing a high-quality optical component by means of a replication process.

Such a replication process is considered to be a quick and inexpensive manner of manufacturing optical components in large numbers. In the replication process, a mould having a precisely defined surface, for example an aspherical surface, is used, and a small amount of a radiation curable resin, for example a UV curable resin, is applied to the mould surface. Subsequently, the resin is spread over the mould surface, so that the cavities in the mould are filled with the resin, after which the whole is irradiated so as to cure the resin and the thus cured product is removed from the mould. The cured product is a negative of the mould surface. An advantage of the replication process is that lenses having a complex refractive surface, such as an aspherical surface, can be manufactured in a simple manner without having to subject the lens body to intricate grinding and polishing processes.

From International application WO 03/069740 in the name of the present inventor there is also known a replication process by which an optical element is formed.

From the above state of the art there are thus known methods by which optical systems are obtained which are made up of separately manufactured optical elements, as a result of which the dimensions of such systems may be considered to be large. In addition, the positional accuracy, viz. in the X, Y and Z directions (between the lens surfaces) of such systems may be called critical.

BRIEF SUMMARY OF THE INVENTION

The object of the present invention is to provide a method of manufacturing a lens assembly by means of a replication process in which the glass substrate that is usually used is no longer required.

Another object of the present invention is to provide a method of manufacturing a lens assembly by means of a replication process which minimises the occurrence of shrink phenomena during the curing of the resin.

Another object of the present invention is to provide a method of manufacturing a lens assembly by means of a replication process in which a high positional accuracy of the lenses relative to each other is achieved.

Another object of the present invention is to provide a method of manufacturing a lens assembly by means of a replication process in which a substantially monolithic structure of optical elements is achieved, wherein various optical functions can be combined.

Yet another object of the present invention is to provide a method of manufacturing a lens assembly by means of a replication process by which lenses having a minimum thickness can be produced.

The method as referred to in the introduction is characterised in that the following steps are carried out:

i) introducing a first, liquid, UV curable composition into a first mould provided with regularly spaced-apart cavities, ii) curing said first composition by UV radiation so as to obtain a first lens element comprising lenses arranged beside each other, wherein the surface of the obtained lens element is the negative of that of the cavities, iii) applying a second, liquid, UV curable composition to the first composition cured in step ii), iv) placing a second mould on the second composition applied in step iii), which second mould is provided with regularly spaced-apart recesses, in such a manner that said recesses will fill with the second composition, v) curing the second composition by UV radiation so as to obtain a second lens element comprising lenses arranged beside each other, wherein the surface of the obtained lens element is the negative of that of the recesses, and vi) possibly removing the first and/or the second mould.

One or more of the above objects are accomplished by carrying out the aforesaid steps i)-vi). Both lens elements are thus obtained by using a replication process. In the embodiment in which the first composition is different from the second composition it is possible to impart specific optical properties to the thus manufactured lens assembly, which can also be realised by using a different shape for the cavities of the first mould than for the recesses of the second mould.

In another embodiment it is preferable to remove the second mould in step vi) and subsequently carry out a step vii), comprising the placement of a spacer plate on the second composition cured in step v) so as to obtain a first assembly comprising a spacer plate, a second lens element and a first lens element. In this way an assembly comprising a spacer plate, a second lens element and a first lens element is obtained in which the spacer plate can function as a spacer between the first assembly and a second lens assembly to be subsequently provided. The spacer plate comprises an opening which is positioned coaxially with a main optical axis of the lens element in question, whilst in a special embodiment the side of said opening is provided with an anti-reflective coating.

According to another possibility, a film is arranged over the uncured first composition prior to carrying out step ii), which film seals the first composition yet to be cured which is present in the cavities of the first mould. When such a film is used, specific optical properties can be obtained, in particular such as diaphragm, anti-reflection, infrared reflection and aperture, but also electric conductivity. Using an electrically conductive film, it has been found to be possible to influence the refractive index of the lenses replicated on the film.

Another possibility would be to supply a current to the electrically conductive film, thus making it possible to adapt the curvature of the lenses replicated on the film. In addition, the film has the special property that the occurrence of shrink phenomena during the curing of the resin can be minimised, so that lense irregularities are prevented.

A particularly suitable film that is transparent to the wavelength used, in particular in the visible range, viz. 400-700 nm, but also in the infrared range, is a flexible film having a thickness of maximally 0.75 mm, in particular maximally 0.5 mm, more in particular maximally 0.2 mm, which film does not become detached from the contours formed by the cured polymeric material present in the mould during the curing process. A film which is suitable for that purpose is transparent to the wavelength that is used, generally in the visible range, viz. 400-700 nm, but also in the infrared range. In addition, no air inclusions may be present between the composition to be cured and the film covering said composition. In addition to glass, also optical polymers of the acrylate, epoxy and similar types can be mentioned as materials for the film. Examples of suitable film materials are polycarbonate film having a thickness of 0.2 mm, glass type D263T (marketed by Schott) having a thickness of 0.2 mm, Melinex (trademark) PET (marketed by DuPont). Other materials for the film are polyvinyl butyral, polyester, polyurethane or PVC. Specific components may be added to the aforesaid film for the purpose of influencing the optical and mechanical properties, in which connection pigments, fillers and anti-shrinkage agents may be considered. The film functions to influence the optical properties. No bearing properties can be attributed to the film.

Using the present method, it has also been found to be possible to place the first assembly on the product obtained after step vi), in which the second mould is removed, so as to obtain a second assembly consisting of, successively, a first lens element, a second lens element, a spacer plate, a second lens element and a first lens element.

The present invention thus relates to a lens assembly consisting of, successively, a spacer plate, a first lens element and a second lens element, whilst in a special embodiment a film may be present between the first lens element and the second lens element, to which film specific optical properties can be imparted. It is also possible to arrange a third or fourth lens element on top of the spacer, on the side remote from the first lens element, in which case the above-described replication process may be used.

The present invention further relates to a lens stack as defined in the appended claims, as well as to a camera or light source in which such a stack is used.

Suitable UV curable compositions include GAF-GARD233 (marketed by DuPont, type vinylpyrrolidone), Norland Inc. NOA-61, NOA-63, NOA-65, Three bond AVR-100 and Sony Chemical UV-1003, possibly provided with the usual additives such as initiators, reactive or nonreactive dilutants, crosslinking agents, fillers, pigments and anti-shrinkage agents.

The present lens assembly is in particular used in cameras, in which small-size lenses are required. In addition, large-scale production of such lenses must be possible, whilst the positional accuracy of the lenses relative to each other, in combination with the spacer plate, is highly critical.

BRIEF DESCRIPTION OF THE DRAWINGS

The present invention will now be explained in more detail with reference to a flow sheet, viz. FIGS. 1-9, and a number of applications, viz.

DETAILED DESCRIPTION OF THE PREFERRED EMBODIMENTS

FIG. 1 schematically shows a first mould 1, which is provided with regularly spaced-apart cavities 6, which cavities 6 have been filled with a first, liquid, UV curable composition 2. After the resin or the first composition 2 has spread over substantially the entire surface of the first mould 1, with the cavities 6 and the parts present between the cavities 6 on the first mould 1 being provided with the still liquid first composition 2, a film 3 is applied, as is shown in FIG. 2a. To effect a proper adhesion between the mould and the UV curable composition, it is preferable to use a silane-type adhesion promoter.

Figure 2B:
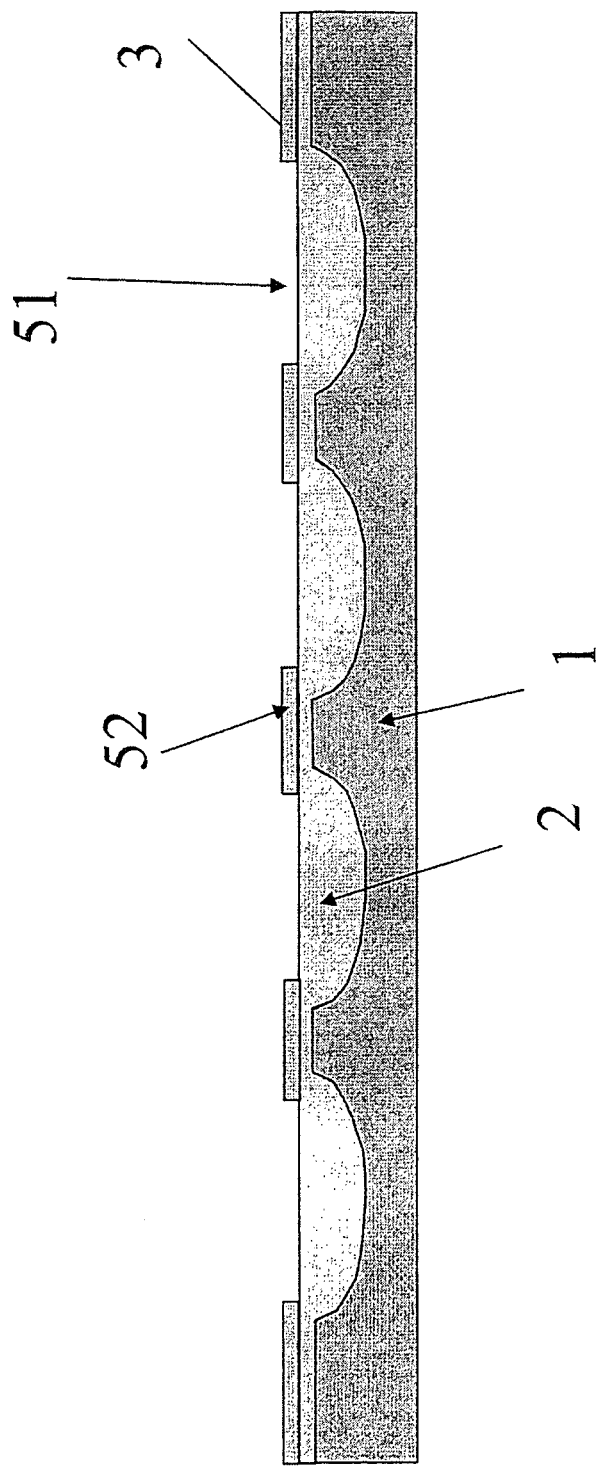
Figure 5A:
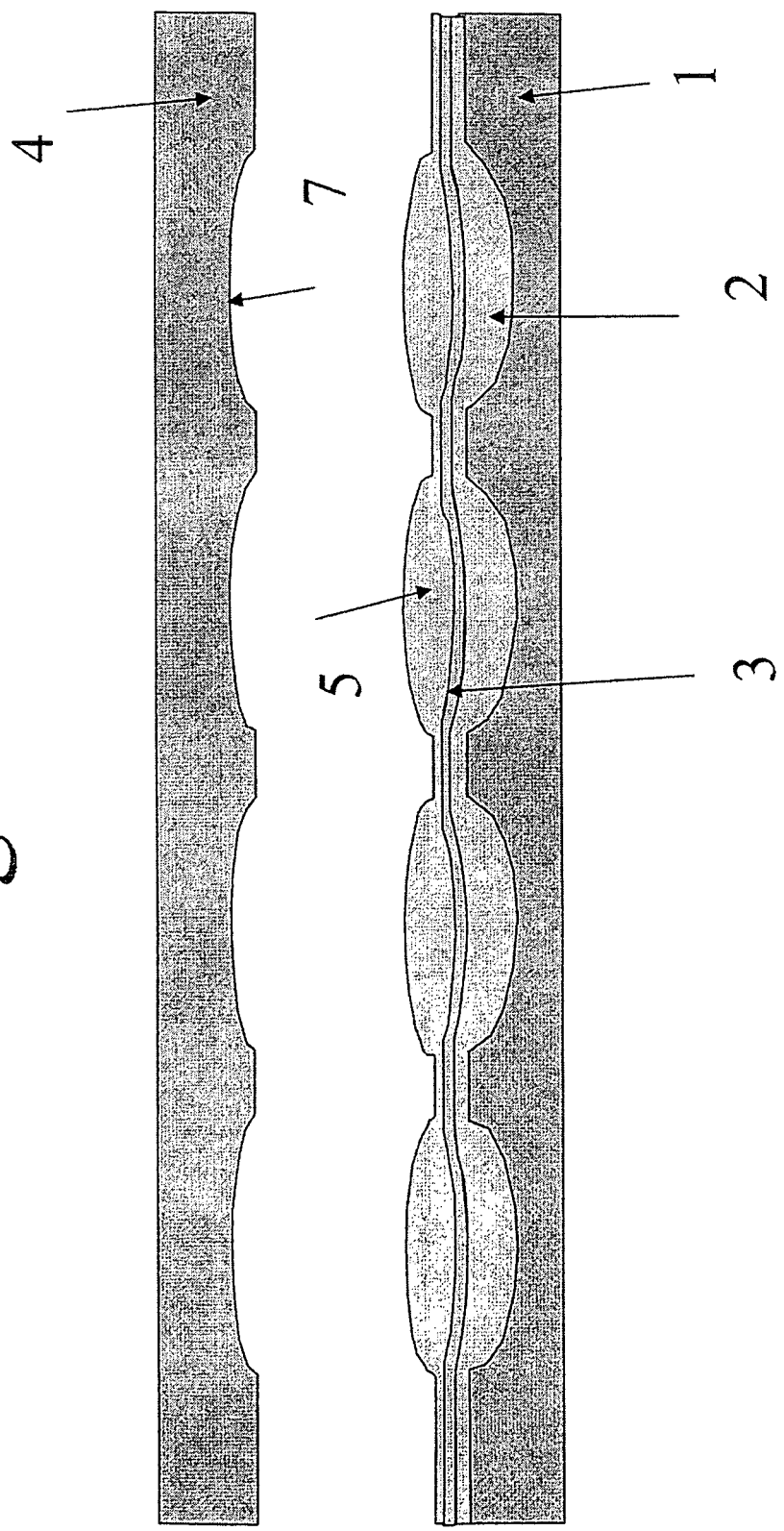

FIG. 2b schematically shows another embodiment of the film 3, which film 3 is provided with transparent parts 51, alternated with non-transparent parts 52, and which is positioned on the first composition 2 in such a manner that the transparent parts 51 more or less coincide with the light path that will pass through the composition 2 formed as a lens. The use of non-transparent parts 52 prevents the incident light on one lens part moving to the adjacent lens part, which phenomenon is also known as "crosstalk". Subsequently, UV irradiation takes place, with FIG. 3 clearly showing that the flexible film 3 present on the first composition 2 will follow the shrinkage caused by the UV curing of said first composition 2. It is also possible to subject the already cured composition to a post-curing process, followed by stabilisation at a high temperature, for example for 9-12 hours at a temperature of 110-150° C. After the first lens element, comprising the cured composition 2 and the film 3 present thereon, which first lens element comprises an array of cured lenses arranged beside each other, has thus been obtained, a second, liquid, UV curable composition 5 is applied to the film 3, as shown in FIG. 4, whereupon a second mould 4 provided with recesses 7 is placed on the still liquid second composition 5, in such a manner that the second, liquid composition 5 will spread over the surface of the film 3 and the recesses 7 and the parts present between the recesses 7 on the second mould 4 will be provided with the second composition 5. In one embodiment the second mould 4, which is provided with recesses 7, is so positioned relative to the first mould 1 that the cavities 6 of the first mould 1 will be located opposite the recesses 7 of the second mould 4. Subsequently, UV curing will take place again, possibly followed by post-curing, after which the second mould 4 will be removed, as is shown in FIG. 5a, with a first lens element 2 comprising cured lenses arranged beside each other thus being present in the first mould 1, which first lens element 2 is provided with a film 3, on which a second lens element 5 obtained from the second mould 4 is present. The lenses both of the first lens element 2 and of the second lens element 4 are cured compositions. Because use is made of a first mould 1 and a second mould 4, the surfaces both of the first lens element 2 and of the second lens element 4 will be the negative of the surfaces of the moulds 1, 2 in question, which can be called typical of the present replication process.

Figure 5B:
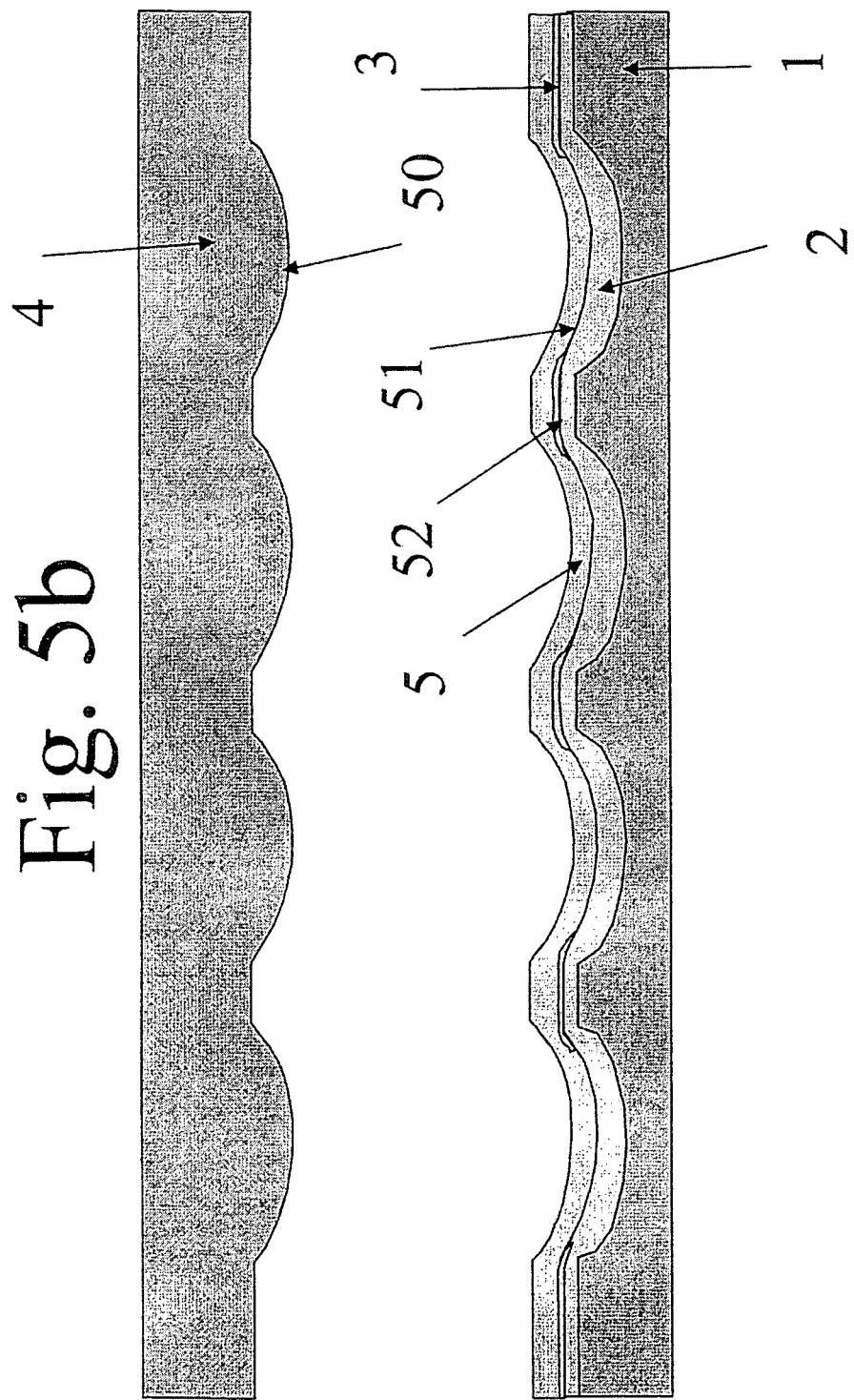

FIG. 5b shows an embodiment in which the second mould 4 has a convex surface 50, so that the second, liquid composition 5 will exhibit a concave configuration, in contrast to the convex configuration shown in FIG. 5a, so that the second mould 4 will be pressed against the first mould 1. FIG. 5b furthermore schematically shows a film 3, from which it appears that the transparent parts 51 are located in the light path that passes through the first composition 2 and the second composition 5. It is also possible to use a second mould 4 (not shown) which comprises a convex surface as well as a surface provided with recesses. The non-transparent parts 52 are so positioned in the two lens elements 2, 5 that the crosstalk phenomenon cannot occur. Suitable UV curable compositions are: polycarbonates, including diethylene glycolbis-(allyl)carbonate, polystyrenes, including polychlorine styrene, polyacrylates, such as poly(trifluoroethyl methacrylate), poly(isobutyl methacrylate), poly(methylacrylate), poly(methyl methacrylate), poly(alphamethyl bromium acrylate), poly(methacrylic acid)-2,3-dibromium propylpoly (phenyl methacrylate poly(pentachlorine phenyl-methacrylate polymer), polyester compounds such as diallylphthalate, poly(vinyl-benzoate), poly(vinylnaphthalene), poly(vinylcarbazole) and silicones in the form of various types of resin materials, as well as acrylic resin, urethane resin, epoxy resin, enthiol resin or thiourethane resin or photopolymer. Exposure preferably takes place with an intensity of between 100 en 2000 W/cm$^2$, in particular 700 W/cm$^2$, and a dose of 1-15 J/cm$^2$, in particular 7 J/cm$^2$, a wavelength in the 320-400 nm range and an exposure time of 1-60 seconds, in particular 10 seconds.

Figure 6:
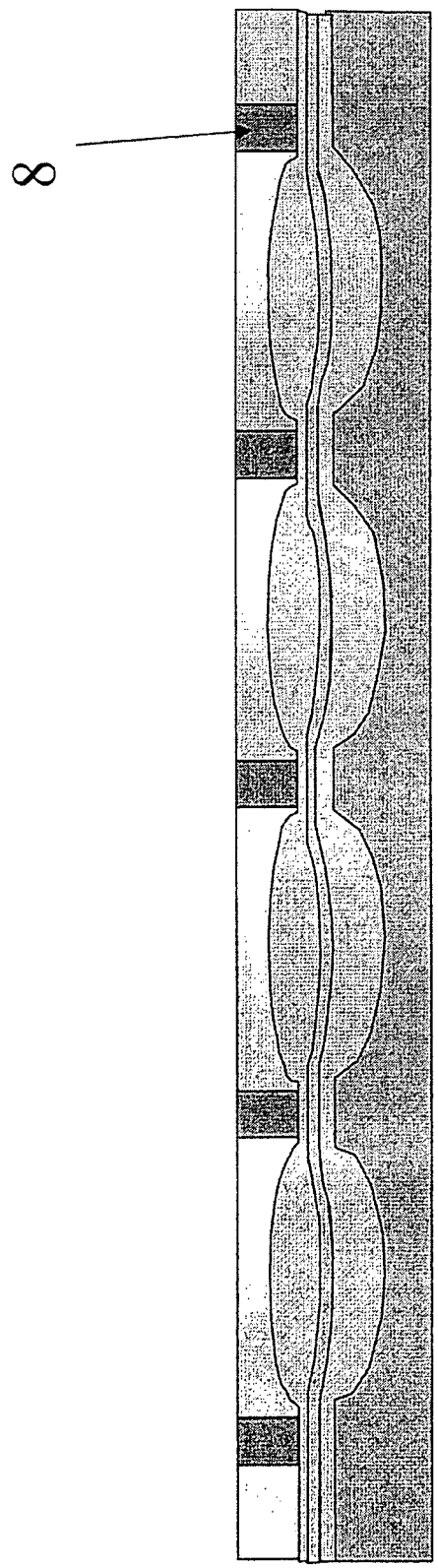
Figure 7:
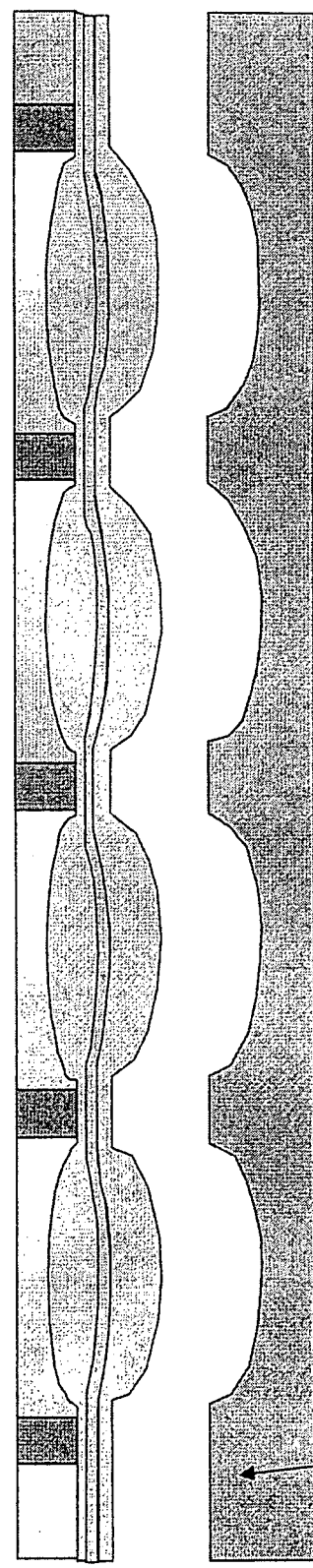
Figure 8:
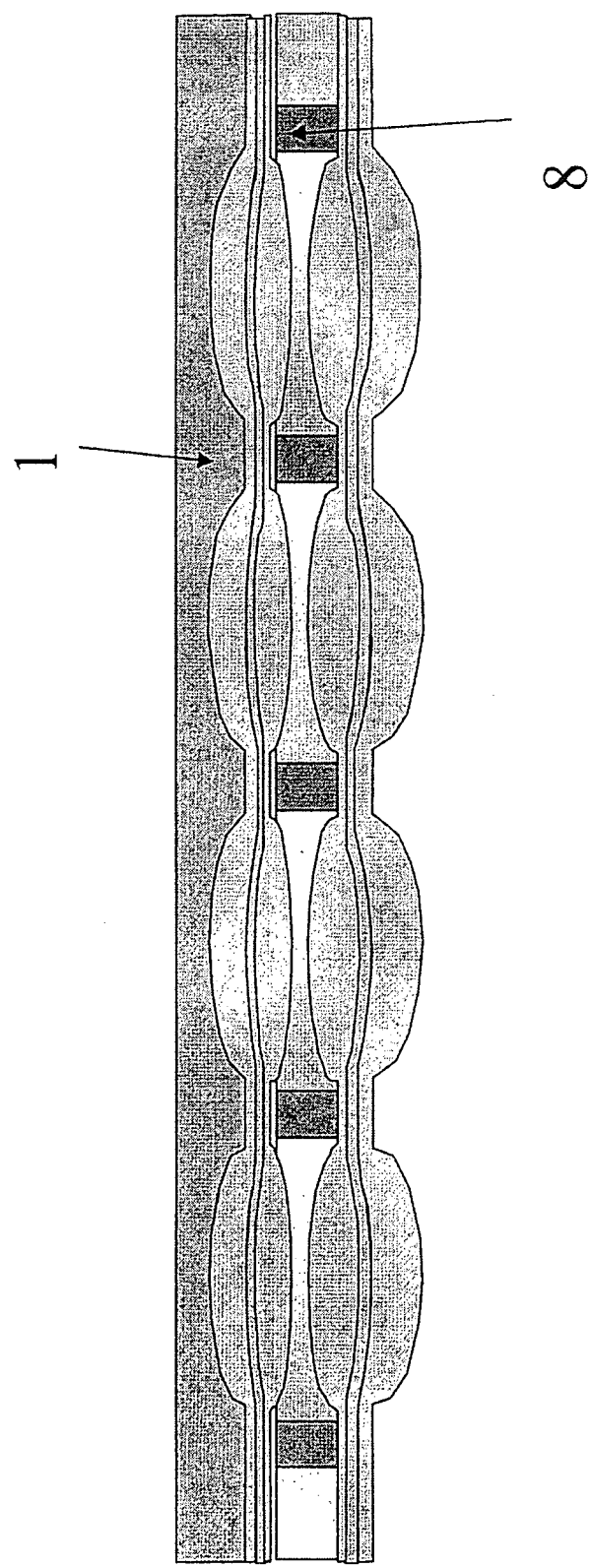
Figure 9:
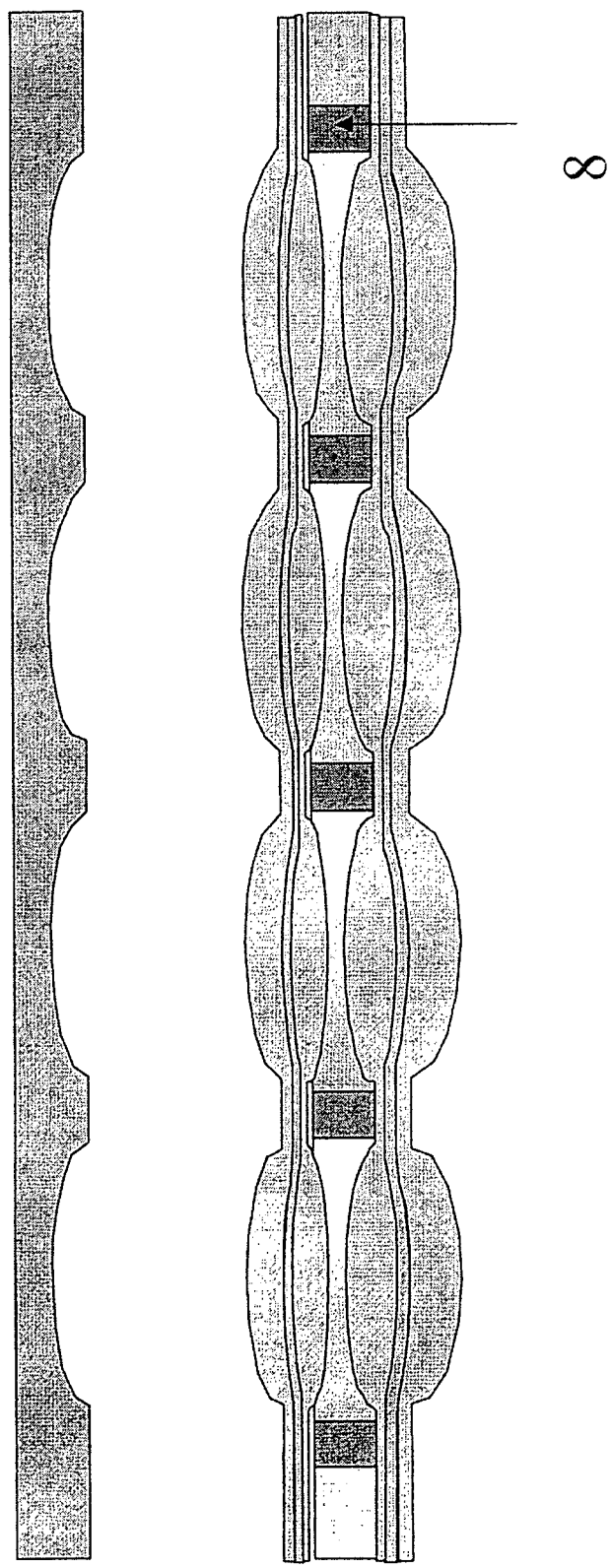

After removal of the second mould 4, as shown in the embodiment of FIG. 5a, a spacer plate 8 as shown in FIG. 6 is placed on the second lens element, in particular on the cured composition 5 present between the lenses of the second lens element, which spacer plate has a thickness or height such that the convexity of the second lens element is less than the aforesaid height or thickness, after which the first mould 1 is removed, as shown in FIG. 7, thus obtaining an assembly consisting of, successively, the spacer plate, the second lens element, the film, and the first lens element. The spacer plate 8 is bonded to the second lens element via a UV curable or thermosetting adhesive (not shown). The spacer plate 8 is made of a rigid material, for example glass, silicon or a composite material such as FR4. The spacer plate 8 is so configured that it will not interfere with the light path through the two separate lens elements, and possibly the film 3 present therebetween. The spacer plate comprises an opening which is positioned coaxially with a main optical axis of the lens element in question, whilst in a special embodiment the side of said opening is provided with an anti-reflective coating. The spacer plate 8 is thus only in contact with the second lens element at the position where the composition 5 has cured on the parts of the mould 4 present between the recesses 7 (see FIGS. 5a/5b). The aforesaid assembly is then placed on the assembly shown in FIG. 5a, with the thus obtained combination being schematically shown in FIG. 8, after which, as shown in FIG. 9, the first mould 1 is removed. Also in the embodiment shown in FIG. 8, the spacer plate 8 is connected to the assembly shown in FIG. 5a by means of the aforesaid adhesive. In this way an assembly has been obtained which consists of a spacer plate 8 that is provided with two separate lens elements on either side thereof, whilst each individual lens element, which is made up of two lens parts, is provided with a film present therebetween. Using such a method, as disclosed in International application WO 2004/027880, it is possible to obtain separate lens constructions which can be suitably used in cameras. Although the embodiments shown in FIGS. 2-9 have been described in conjunction with the use of a film, it should be understood that the use of such a film is optional. Although the embodiments shown in FIGS. 6-9 are based on the assembly shown in FIG. 5a, it should be understood that it is also possible to use the construction shown in FIG. 5b. The four lens constructions shown in FIG. 9 only serve by way of explanation, and in practice a large number of such lens constructions are produced simultaneously on a wafer level and separated from each other via usual techniques such as the technique disclosed in WO 2004/027880, which document may be considered to be incorporated herein.

Figure 10:
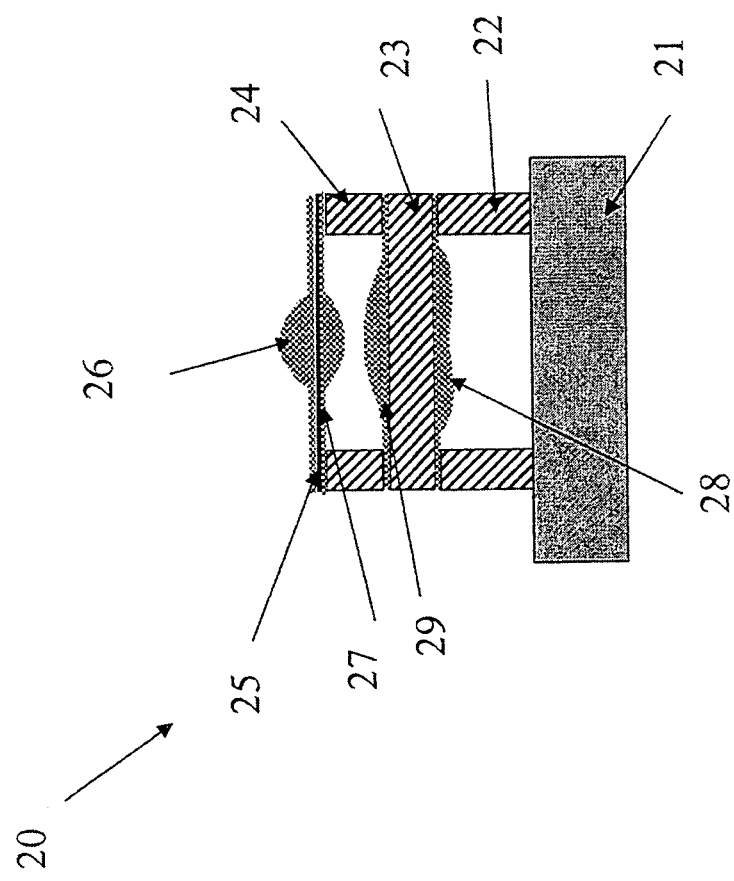
FIGS. 10-13, in which connection it should be noted, however, that the present invention is by no means limited to such a special embodiment.

FIG. 10 schematically shows a lens stack 20 in which a lens assembly obtained by using the present method is used. An optically active element, for example a VCSL (light source), a CCD/CMOS sensor 21, is provided with a spacer 22, whilst a glass plate 23 extending along the length of the optical element 21 is positioned on the spacer 22, which glass plate 23 is provided on either side thereof with lenses 28, 29 replicated thereon. Subsequently a spacer 24 is disposed, on which spacer 24 a lens element manufactured according to the present method is present, which comprises a film 25 that is provided with replicated lens elements 26, 27 on either side thereof. The spacers 22, 24, the glass plate 23 and the lens elements 28, 29, 27, 26 are bonded together by means of adhesives, for which thicknesses in the order of 5-100 μm may be used. The aforesaid spacers are made of glass, and the replicated lens elements are polymer-based. Although it is indicated herein that the film 25 and the two lens elements 26, 27 replicated thereon are located furthest away from the optically active element 21, it is also possible to use embodiments in which the aforesaid film 25 and the lens elements 26, 27 are located closest to the optically active element 21. The spacer 22 may be made of the same material as the previously discussed spacer 8. The spacer 22 comprises an opening which is positioned coaxially with a main optical axis of the lens element in question, whilst in a special embodiment the side of said opening is provided with an anti-reflective coating.

Figure 11:
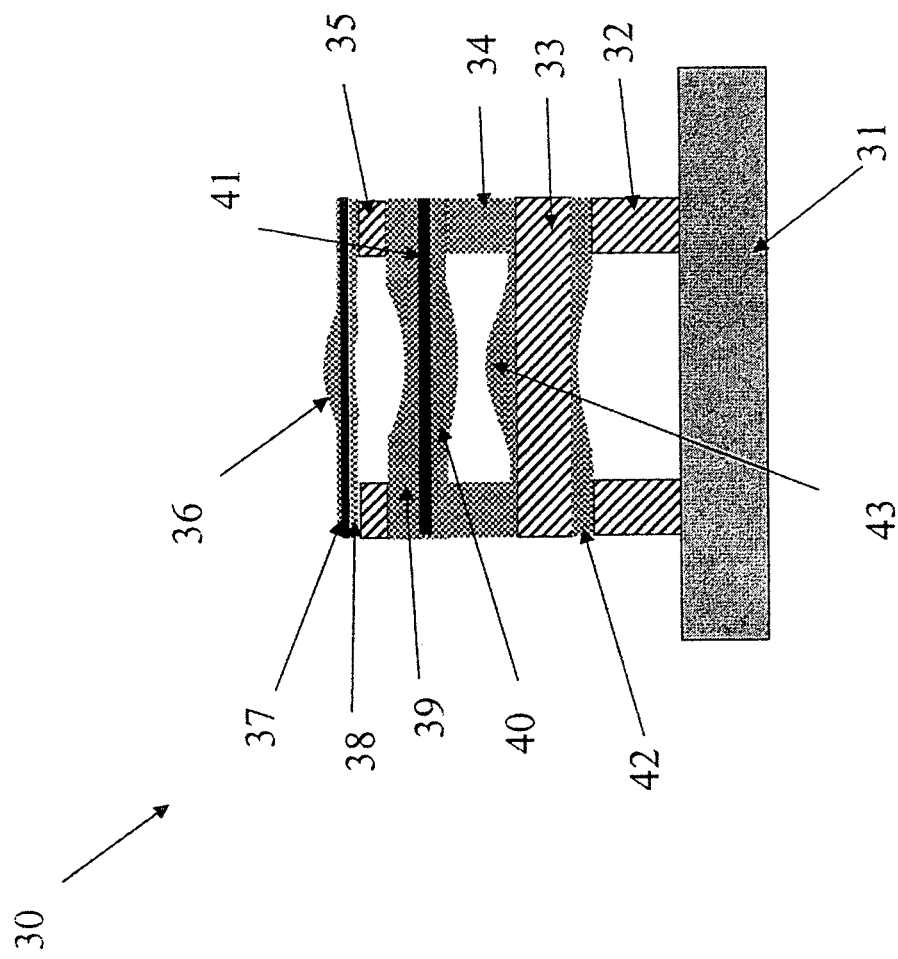

FIG. 11 schematically shows a lens stack 30, in which an optically active element, such as a VCSL (light source), a megapixel CMOS sensor 31, is provided with a spacer 32, on which spacer 32 a glass plate 33 is positioned, which glass plate 33 is provided on either side thereof with lens elements 43, 42 replicated thereon. In the illustrated embodiment, the spacer 34 is integrated in the lens element 43, which means that the lens element 43 and the spacer 34 form a uniform or inseparable whole. Furthermore an embodiment is possible in which the spacer 34 is provided as a separate component, with the lens elements 40, the spacer 34 and the lens element 43 thus being durably interconnected by means of an adhesive. According to yet another embodiment, the spacer 34 is integrated in the lens element 40, so that only one layer of adhesive is required for durably interconnecting the glass plate 33 and the film 41. Using such integrated spacers, it has been found to be possible to obtain more advantageous tolerance values for the stack height, because the number of adhesive layers and elements to be used has been reduced. Arranged on said spacer 34 is a lens assembly manufactured by means of the present method, comprising a film 41 provided with a first and a second lens element 39, 40 replicated on respective sides thereof. In addition thereto, a spacer 35 is provided, on which spacer 35 another lens assembly manufactured according to the present method is disposed, which comprises a film 37 provided with lens elements 36, 38 replicated on respective sides thereof. The spacers 32 and 35, the glass plate 33 and the lens elements 42, 43, 40, 39, 38, 36 are bonded together by means of adhesives. Although it is indicated herein that the glass plate 33 provided with lens elements 42, 43 is located closest to the optically active element 31, it is also possible to use embodiments in which a film 41 provided with the lens elements 39, 40 is arranged top of on the spacer 32, for example, on which the glass plate 33 and finally the film 37 provided with the lens elements 36, 38 are in turn arranged.

Figure 12:
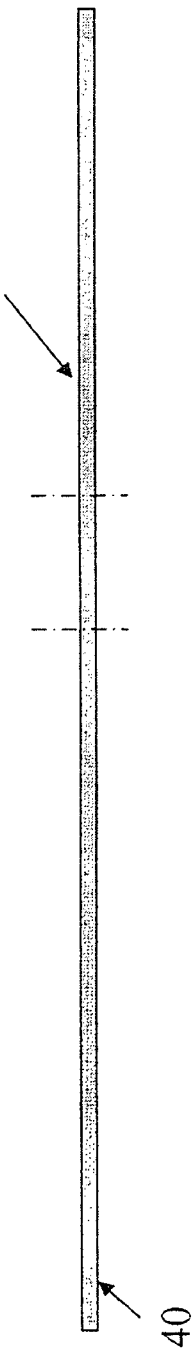
Figure 13:
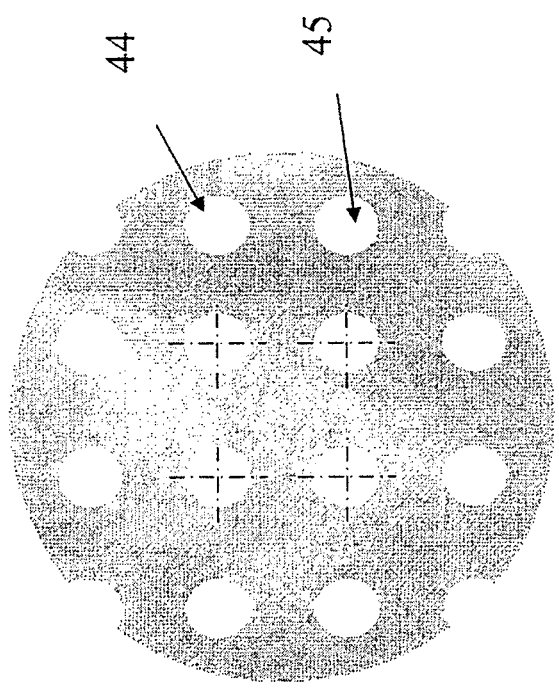

FIG. 12 schematically shows a film 40 used in the present method, which film 40 is provided with a top coating 44, which is shown in top plan view in FIG. 13. The top coating 44 is provided with regularly spaced-apart openings 45, which are used as diaphragms. The top coating 44 may for example be a non-transparent layer, for example with a base of chromium oxide. In another embodiment it is also possible to apply an infrared coating as the top coating 44, which top coating may also have a filter function, for example using a polycarbonate film that will absorb UV light. The film 40 shown in FIG. 12 may be regarded as the films 25, 37 and 41 shown in FIGS. 10 and 11.

What is claimed is:

1. A method of manufacturing a lens assembly by means of a replication process, characterised in that the following steps are carried out i) introducing a first, liquid, UV curable composition into a first mould provided with regularly spaced-apart cavities, ii) curing said first composition by UV radiation so as to obtain a first lens element comprising lenses arranged beside each other, wherein the surface of the obtained lens element is the negative of that of the cavities, iii) applying a second, liquid, UV curable composition to the first composition cured in step ii), iv) placing a second mould on the second composition applied in step iii), which second mould is provided with regularly spaced-apart recesses, in such a manner that said recesses will fill with the second composition, v) curing the second composition by UV radiation so as to obtain a second lens element comprising lenses arranged beside each other, wherein the surface of the obtained second lens element is the negative of that of the recesses, and vi) possibly removing the first and/or the second mould.

2. A method according to claim 1, characterised in that the second mould is removed in step vi) and subsequently a step vii) is carried out comprising the placement of a spacer plate on the second composition cured in step v) so as to obtain a first assembly comprising a spacer plate, a second lens element and a first lens element.

3. A method according to claim 1, characterised in that a film is arranged over the uncured first composition prior to carrying out step ii), which film seals the first composition present in the cavities of the first mould.

4. A method according to claim 2, characterised in that the first assembly is placed on the product obtained after step vi), in which the second mould is removed, so as to obtain a second assembly consisting of, successively, a first lens element, a second lens element, a spacer plate, a second lens element and a first lens element.

5. A method according to claim 1, characterised in that the first lens element has a refractive index different from that of the second lens element.

6. A method according to claim 1, characterised in that step i) is carried out in such a manner that the first, UV curable composition flows out over the first mould, whilst the parts present between the cavities are also provided with the first, UV curable composition.

7. A method according to any one or more of the preceding claims, characterised in that steps iii) and iv) are carried out in such a manner that the second, UV curable composition flows out over the second mould, whilst the parts present between the recesses are also provided with the second, UV curable composition.

8. A lens assembly consisting of, successively, a first replicated lens element and a second lens element replicated thereon as obtained by using a method as defined in claim 1.

9. A lens assembly according to claim 8, characterised in that a film is present between the first replicated lens element and the second lens element replicated thereon.

10. A lens assembly according to claim 9, characterised in that said film has a function selected from the group consisting of diaphragm, anti-reflection, infrared reflection, electric conductivity and aperture.

11. An assembly according claim 9, characterised in that said film is transparent in the wavelength range of 400-700 nm.

12. An assembly according to claim 9, characterised in that said film is flexible and has a thickness of maximally 0.75 mm, in particular maximally 0.5 mm, more in particular maximally 0.2 mm.

13. An assembly according to claim 8, characterised in that a spacer abuts against the first lens element, in particular against the parts present between the lenses arranged beside each other.

14. An assembly according to claim 9, characterised in that said film is provided with regularly spaced-apart openings, wherein the positions of said openings correspond to the light path through the respective lens element.

15. An assembly according to claim 14, characterised in that said film is non-transparent to light in the active range of 400-700 nm so as to prevent undesirable crosstalk between lens elements arranged beside each other.

16. A lens assembly according to claim 13, characterised in that an adhesive, preferably of the UV curable or thermosetting type, is present between the spacer and the respective lens element.

17. A lens stack comprising an optically active element and one or more spacer substrates and lens elements placed thereon, characterised in that the stack consists of, successively, i) an optically active element, ii) a first spacer iii) a glass plate, which extends over substantially the entire area of said optically active element, iv) a second spacer, and v) an assembly of a first lens element and a second lens element obtained by using a method as defined in claim 1.

18. A lens stack according to claim 17, characterised in that a film is present between said first lens element and said second lens element.

19. A lens stack according to claim 18, characterised in that said glass plate is provided with a lens replicated thereon on at least one side thereof, preferably on both sides thereof.

20. A lens stack according to claim 1, characterised in that a second assembly vi) is present on said assembly v) with the interposition of a spacer, which second assembly vi) comprises a third and a fourth lens element obtained by using a method as defined in claim 1.

21. A lens stack according to claim 20, characterised in that a film is present between said third and said fourth lens element.

22. A lens stack according to claim 21, characterised in that said film has a function selected from the group consisting of diaphragm, anti-reflection, infrared reflection, electric conductivity and aperture.

23. A lens stack according to claim 17, characterised in that said film is transparent in the 17, range of 400-700 nm.

24. A lens stack according to claim 17, characterised in that said film is flexible and has a thickness of maximally 0.75 mm, in particular maximally 0.5 mm, more in particular maximally 0.2 mm.

25. A lens stack according to claim 17, characterised in that said film is provided with regularly spaced-apart openings, wherein the positions of said openings correspond to the light path through the respective lens element.

26. A lens stack according to claim 25, characterised in that said film is non-transparent to light in the active range of 400-700 nm so as to prevent undesirable crosstalk between lens elements arranged beside each other.

27. A lens stack according to claim 17, characterised in that said spacer iv) is integrated in the first lens element of the assembly v).

28. A lens stack according to claim 19, characterised in that said spacer iv) is integrated in the lens replicated on said glass plate iii).

29. A camera provided with a lens stack according to claim 17.

30. A light source provided with a lens stack according to claim 17.

31. A camera provided with a lens assembly according to claim 8.

32. A light source provided with a lens assembly according to claim 8.

* * * * *

UNITED STATES PATENT AND TRADEMARK OFFICE
CERTIFICATE OF CORRECTION

PATENT NO. : 8,482,857 B2  
APPLICATION NO. : 12/681986  
DATED : July 9, 2013  
INVENTOR(S) : Edwin Maria Wolterink, Koen Gerard Demeyer and Alexandra Emanuela Weinbeck Page 1 of 1

It is certified that error appears in the above-identified patent and that said Letters Patent is hereby corrected as shown below:

In the Claims

Column 8, line 59, (claim 23, line 2) "17", should be --wavelength--

Signed and Sealed this  
Fourth Day of March, 2014

Michelle K. Lee  
*Deputy Director of the United States Patent and Trademark Office*